United States Patent [19]

Shimizu

[11] Patent Number: 5,420,655
[45] Date of Patent: May 30, 1995

[54] COLOR PROJECTION SYSTEM EMPLOYING REFLECTIVE DISPLAY DEVICES AND PRISM ILLUMINATORS

[75] Inventor: Jeffrey A. Shimizu, Peekskill, N.Y.

[73] Assignee: North American Philips Corporation, New York, N.Y.

[21] Appl. No.: 991,689

[22] Filed: Dec. 16, 1992

[51] Int. Cl.⁶ .............................................. G03B 21/28
[52] U.S. Cl. ........................................ 353/33; 353/34; 359/833
[58] Field of Search ....................... 353/31, 33, 34, 37, 353/99, 81, 98; 359/40, 196, 197, 223, 290, 291, 292, 831, 833, 834, 224; 340/783, 795; 358/60, 61, 61, 231

[56] References Cited

U.S. PATENT DOCUMENTS

| | | | |
|---|---|---|---|
| 4,638,309 | 1/1987 | Ott | 340/783 |
| 4,680,579 | 7/1987 | Ott | 340/783 |
| 4,864,390 | 9/1989 | McKechnie et al. | 353/34 |
| 4,912,614 | 3/1990 | Goldenberg | 353/31 |
| 4,943,155 | 7/1990 | Cross, Jr. | 353/33 |
| 4,969,730 | 11/1990 | Van Den Brandt | 353/31 |
| 4,983,032 | 1/1991 | Van Den Brandt | 353/33 |

Primary Examiner—William A. Cuchlinski, Jr.
Assistant Examiner—William C. Dowling
Attorney, Agent, or Firm—John C. Fox

[57] ABSTRACT

In a color projection display system employing display devices operating in the reflective mode, the optical path lengths are considerably reduced by employing prism illuminators immediately adjacent the display devices to illuminate the reflective display surface and to spatially separate the incident and reflected illumination. Such color projection systems are easier to arrange and offer sufficient brightness to be useful in both home and commercial applications, such as movie theaters.

13 Claims, 2 Drawing Sheets

COLOR PROJECTION SYSTEM EMPLOYING REFLECTIVE DISPLAY DEVICES AND PRISM ILLUMINATORS

BACKGROUND OF THE INVENTION

This invention relates to color projection systems, and more particularly relates to such systems employing display devices operating in the reflective mode.

Color projection systems such as for color television enable the production of image displays much larger than that reproduced on the display device itself. For example, in conventional three-tube color projection television sets, a full color image 40 inches or more in size is produced by superimposing separate red, blue and green images from three monochrome cathode ray tube (CRT) display devices, each 7 to 9 inches in size. Newer projection television sets use even smaller (e.g., 2 inch) liquid crystal display (LCD) devices operating in the transmissive mode in place of the CRTs. However, the overall optical efficiency of such LCD systems is typically on the order of only about two percent, making it difficult to design systems having acceptable brightness.

In designing a projection system using display devices operating in the reflective mode, the typically relatively small angle between the incident and reflected beams dictates a relatively long optical path in order to adequately spatially separate these beams, leading to a complex geometry for the optical system. Using three display devices, one for each of the primary colors red, blue and green, to form a full color image, significantly increases the complexity of such a system.

In U.S. Pat. No. 4,969,730, a beam separating element based on the principal of total internal reflection of one of the beams, is employed in a color projection system employing LCDs operating in the reflective mode. In this system, a source beam is split into red, blue and green beams by a dichroic cross, which also directs the split beams to the LCDs and recombines them into a single beam for projection after reflection. The beam separating element enables a spatial separation of the source beam from the projection beam.

There are several disadvantages to such an arrangement. One such disadvantage is that the dichroic cross is a relatively expensive element and has poor optical performance. One reason for this poor performance is that the incident and reflected beams strike each dichroic filter element (41, 42) of the cross (40) at different angles (see FIG. 2 of U.S. Pat. No. 4,969,730). Since performance of the filters varies with angle of incidence, and the angular relationship between the dichroic cross and the LCDs is fixed, there is no opportunity to optimize the angle of incidence of the beams on the filter elements of the cross. Another reason is that each filter element is used for both separation and recombination of the light beams. Thus, there is no opportunity to optimize the filter design for either separation or recombination, for example, to adjust spectral shaping. Another disadvantage is that by placing the beam separation element a significant distance away from the LCDs in order to accommodate the dichroic cross, it must be relatively large in size, and thus relatively costly.

A newer type of display device, the so-called deformable mirror device or DMD, is now being considered for projection applications. The DMD is a solid state device fabricated from a single piece of silicon, and comprising a matrix array of deformable mirror elements, each of which can be made to tilt in response to an applied voltage, and thus to direct reflected light into or out of an optical projection system. Using a matrix of row and column electrodes, the individual mirror elements can be made to tilt "on" or "off" in response to a video signal, to thereby re-create the video image for projection. See, for example, U.S. Pat. Nos. 4,638,309, 4,680,579 and 5,097,544.

In designing a projection system using such DMDs, a long optical path length is required due to the relatively small angular separation between the incident and projected beams.

It is possible, due to the fast response times of the mirror elements to the applied voltages, to form a full color image using a single DMD, by sequentially addressing the red, blue and green video fields at a sufficiently rapid rate that the eye integrates these sequential images into a full color image. However, such an approach reduces light efficiency by a factor of three, since only one color can be presented to the screen at a time.

OBJECTS AND SUMMARY OF THE INVENTION

Accordingly, it is an object of the invention to provide a color projection system employing display devices operating in the reflective mode;

It is another object of the invention to provide such a color projection system in which the color image is formed by superimposing monochrome images from two or more of such display devices;

It is yet another object of the invention to provide such a color projection system in which the optical path lengths between the display devices, the light source and the projection lens is significantly reduced.

It is still another object of the invention to provide such a color projection system in which the size and complexity of arrangement of the optical elements is reduced.

It is still another object of the invention to provide such a color projection system in which the optical performance is improved.

According to the invention, a color projection system employing two or more display devices operating in the reflective mode is provided, in which each display device is illuminated by a beam separation element, herein called a prism illuminator, each such prism illuminator being a composite optical element comprising first and second prisms oriented to have their long sides facing each other, but separated by a gap having a different index of refraction (e.g., an air gap), the first prism having one short side as an input face and another short side as an illuminator face, and the second prism having a short side as an output face. In operation, an illumination beam enters the prism illuminator via the input face, is redirected to the illumination face by total internal reflection at the gap, where it exits the prism illuminator to illuminate the reflective surface of the display device such as a DMD. Illumination reflected by the device, for example, by DMD mirror elements in the "on" position, re-enters the prism illuminator via the illumination face, traverses the gap and exits the prism illuminator via the output face. Such prism illuminators enable the wide separation of the input and output beams despite the relatively narrow angle between the beams incident on and reflected from the devices, leading to a considerable shortening of the optical path lengths and a considerable reduction of the complexity of the optical path geometry.

In a preferred embodiment of the invention, a color projection system comprises a light source, two separation filters for separating the source into red, blue and green sub-beams, a prism illuminator arranged in the path of each sub-beam, a reflective display device located opposite the illumination face of each prism illuminator, two recombination filters for recombining the sub-beams into a single beam, and a projection lens for projecting the beam onto a display screen.

Preferably, the display devices are arranged at equal path lengths from the light source and at equal path lengths from the projection lens.

DESCRIPTION OF THE PREFERRED EMBODIMENTS

Figure 1:
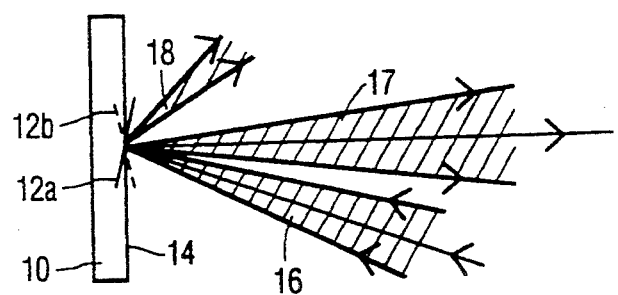
FIG. 1 is a schematic diagram showing the angular orientation of the incident, and the "on" and "off" reflected cones of light for a DMD.

Referring now to FIG. 1, DMD 10 is shown schematically in side elevation, with a representative mirror element 12 of a matrix array of mirror elements on surface 14, not shown. In practice, the DMD is fabricated from a single piece of silicon in a manner that the individual elements are tiltable by about plus or minus 10 degrees from the plane of surface 14 in response to an applied voltage. In FIG. 1, an "on" condition is assigned to element 12 in position 12a, and an "off" condition is assigned for position 12b, shown in phantom. A light cone 16 of plus or minus 7 degrees incident on the element 12 results in reflected cones 17 and 18 for the "on" and "off" conditions, respectively.

Figure 2:
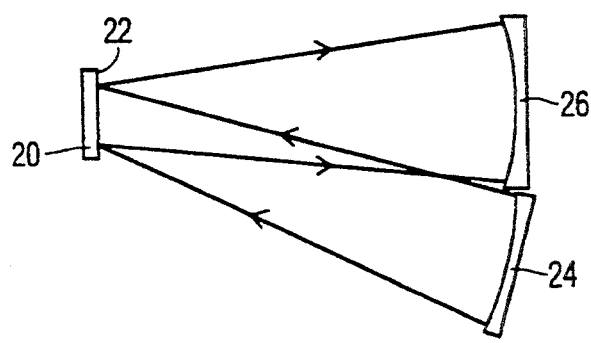
FIG. 2 is a schematic diagram showing the optical path length required to separate the illumination beam from the projection beam.

FIG. 2 shows DMD 20 having substantially its entire array surface 22 illuminated by incident illumination beam 24, resulting in projection beam 26. Due to the relatively narrow angle between these beams, a relatively long optical path is required to adequately spatially separate them, for example, 140 mm from the DMD for a DMD device length of 15 mm.

Figure 3:
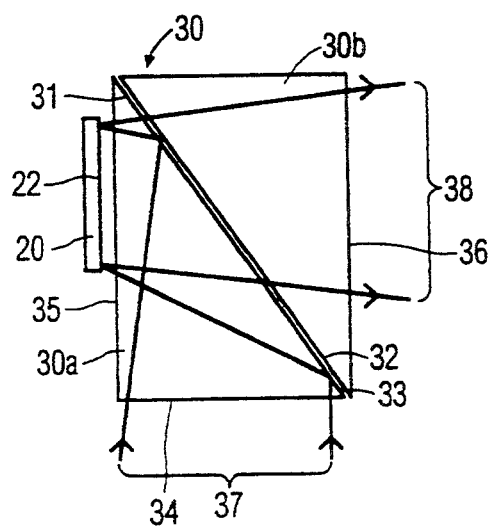
FIG. 3 is a schematic diagram showing the relationship between the illumination and projection beams for a DMD illuminated by a prism illuminator.

FIG. 3 illustrates the effect of a prism illuminator in spatially separating the illumination and projection beams. Prism illuminator 30 is a composite optical element comprised of two prisms 30a and 30b, having their long sides 31 and 32 facing each other, but spaced apart to form a gap 33. Gap 33 may be filled with air or another material having a different refractive index. Short sides 34 and 35 of prism 30a function as input and illumination faces, respectively. Short side 36 of prism 30b functions as an output face. In operation, illumination beam 37 enters the prism illuminator through input face 34, strikes gap 33 at an angle greater than the critical angle so that it is totally internally reflected and redirected toward illumination face 35, where it leaves the prism illuminator to illuminate the reflective surface 22 of DMD 20. Illumination reflected from the DMD 20 re-enters the prism illuminator at illumination face 35, traverses gap 33, and exits through output face 36 as a projection beam 38.

Figure 4:
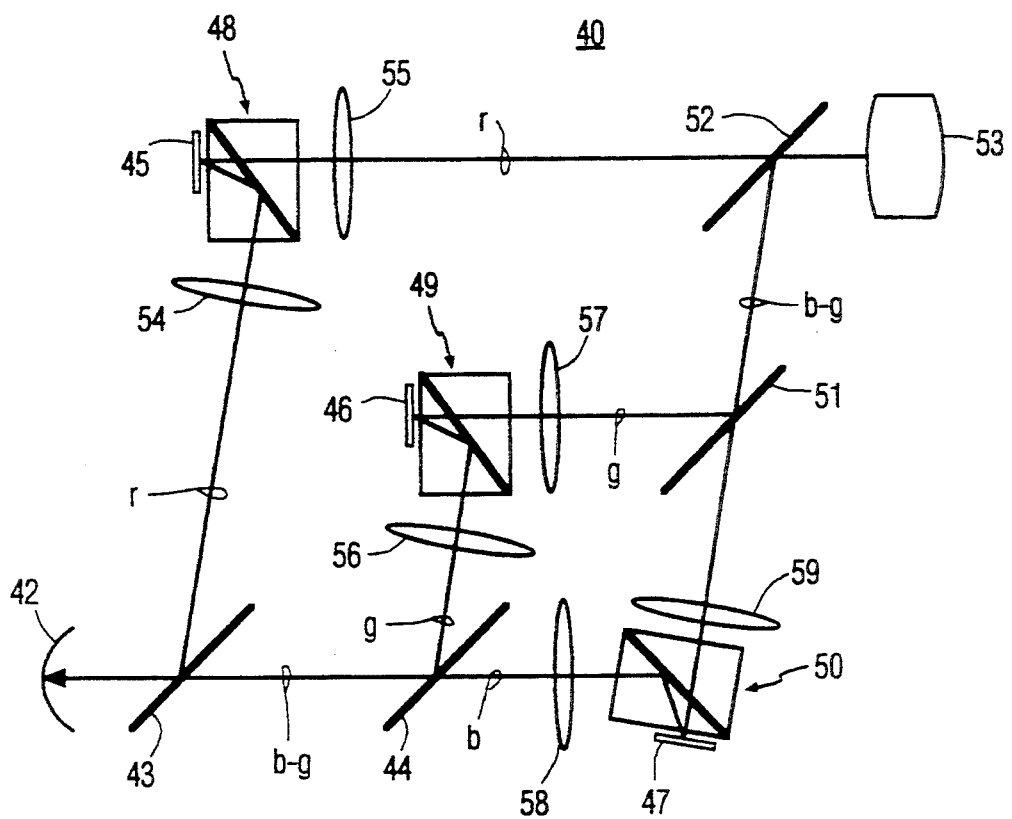
FIG. 4 is a schematic diagram of a three panel color projection system employing DMDs and prism illuminators in accordance with the invention.

This compact illuminator arrangement allows the design of a three panel color projection system such as the one shown schematically in FIG. 4. Projection system 40 includes a white light source 42, separation filters 43 and 44 (for example, dichroic filters), three DMD-prism illuminator sets 45–48, 46–49 and 47–50, two recombination filters 51 and 52 (for example, dichroic filters) and projection lens 53. Optionally, field lenses 54 through 59 may be placed on the input and output sides of the respective prism illuminators in order to reduce beam size throughout the system.

In operation, white light from source 42 incident on separation filter 43 is separated by such filter into a red beam r, which is reflected toward prism illuminator 48, and a blue-green beam b-g, which is transmitted. Beam b-g is then separated by the second separation filter 44, into a green beam g, which is reflected toward prism illuminator 49, and blue beam b, which is transmitted to prism illuminator 50. Prism illuminators 48, 49 and 50 illuminate the DMDs 45, 46 and 47 with the red, green and blue beams, respectively, after which prism illuminator 48 transmits the reflected red beam to recombination filter 52, which transmits the red beam to projection lens 53, and prism illuminators 49 and 50 transmit the reflected green and blue beams to recombination filter 51, which reflects the green beam and transmits the blue beam toward filter 52, which reflects both beams to projection lens 53.

Choosing a light source of known collection efficiency and estimating efficiency factors for the other elements of the system enables the calculation of an estimated efficiency for such a projection system. For a Xenon arc lamp having a collection efficiency of about 40 percent and other estimated efficiency factors as shown in Table I, the total system efficiency is calculated to be about 12.6 percent. In contrast, the system efficiency of a typical three panel transmissive LCD color projection system is on the order of about 2 percent.

Choosing a Xenon arc lamp of 2000 watts, which has an output of about 80,000 lumens, and a 40 foot wide projection screen having a gain factor of 1.5, it can be calculated that such a system would deliver about 10,000 lumens or about 17 foot lamberts to the screen. By contrast, an average 40 foot wide movie theater screen would have a brightness of about 10 foot lamberts. Thus, such a system could not only be useful for the display of television or other color images in the home, but could also be used to deliver programs and movies electronically to theaters, thus eliminating the current need for massive film distribution networks.

The invention has been described in terms of a limited number of embodiments. Other embodiments and variations of embodiments and variations of embodiments will become apparent to those skilled in the art, and are intended to be encompassed within the scope of the appended claims. For example, separation recombination filters can be used for any combination of RGB as desired. I.e., each subbeam in the system can be any color (RGB) desired.

TABLE 1

| | |
|---|---|
| Collection | 0.40 |
| Heat Filter | 0.90 |
| Integration/fill factor | 0.70 |

TABLE 1-continued

| Color separation/recombination | 0.90 |
|---|---|
| Field Lenses | 0.97 |
| Prism | 0.94 |
| DMD | 0.68 |
| Projection Lens | 0.90 |
| System Efficiency | 0.126 |
| Lamp output (2 kW Xe) | 80,000 lm |
| Total Screen Lumens | 10,100 lm |
| 22.5' × 40' Gain 1.5 Screen | × 1.5/22.5*40 |
| Screen Brightness | 16.9 ftL |

I claim:

1. A color projection display apparatus comprising;
 (a) a white illumination source;
 (b) means for splitting an illumination beam from the source into at least two sub-beams;
 (c) at least two DMD display devices having a reflective display surface and operating in the reflective mode;
 (d) a prism illuminator for each display device, each prism illuminator consisting of:
  (i) a first prism with a first input face, a second illumination face, and a third output face; and
  (ii) a second prism having a first input face and a second output face;
  the illumination face of the first prism directly adjacent to the reflective display surface of a display device;
 (e) means for directing the sub-beams to the input faces of the prism illuminators;
 (f) means for recombining the sub-beams from the output faces of the prim illuminators; and
 (g) means for projecting the recombined sub-beams to a display screen.

2. The apparatus of claim 1 in which there are three display devices.

3. The apparatus of claim 2 in which;
 (a) the means for splitting the illumination beam into sub-beams comprises a first separation filter for splitting the illumination beam into a red beam and a blue-green beam, and a second separation filter for splitting the blue-green beam into a blue beam and a green beam;
 (b) the means for recombining the sub-beams comprises a first recombination filter for recombining the blue and green sub-beams into a blue-green sub-beam, and a second recombination filter for recombining the blue-green and red sub-beams.

4. The apparatus of claim 3 in which the display devices are located at substantially equal path lengths from the source, and at substantially equal path lengths from the projecting means.

5. The apparatus of claim 1 in which field lenses are located adjacent the input and output faces of the prism illuminators.

6. The apparatus of claim 1 in which the source is a Xenon arc lamp.

7. The apparatus of claim 3 in which the separation and recombination filters are dichroic filters.

8. A color projection display apparatus comprising;
 (a) a white illumination source;
 (b) means for splitting an illumination beam from the source into at least two sub-beams;
 (c) at least two display devices having a reflective display surface and operating in the reflective mode;
 (d) a prism illuminator for each display device, each prism illuminator consisting of:
  (i) a first prism with a first input face, a second illumination face, and a third output face;
  (ii) a second prism having a first input face and a second output face;
  the third output face of the first prism facing the first input face of the second prism and
  the illumination face of the first prism directly adjacent to the reflective display surface of a display device;
 (e) means for directing the sub-beams to the input faces of the prism illuminators;
 (f) means for recombining the sub-beams from the output faces of the prism illuminators; and
 (g) means for projecting the recombined sub-beams to a display screen and
 (h) field lenses located adjacent to input and output faces of the prism illuminators,
 the display devices located at substantially equal path lengths from the source, and at substantially equal path lengths from the projecting means and each sub-beam from each prism illuminator being independently directed to said means for combining the sub-beams.

9. A color projection display apparatus comprising;
 (a) a white illumination source;
 (b) means for splitting an illumination beam from the source into at least two sub-beams;
 (c) at least two display devices having a reflective display surface and operating in the reflective mode;
 (d) a prism illuminator for each display device, each prism illuminator consisting of:
  (i) a first prism with a first input face, a second illumination face, and a third output face;
  (ii) a second prism having a first input face and a second output face;
  the third output face of the first prism facing the first input face of the second prism and
  the illumination face of the first prism directly adjacent to the reflective display surface of a display device;
 (e) means for directing the sub-beams to the input faces of the prism illuminators;
 (f) means for recombining the sub-beams from the output faces of the prism illuminators; and
 (g) means for projecting the recombined sub-beams to a display screen,
 the display devices located at substantially equal path lengths from the source, and at substantially equal path lengths from the projecting means and each sub-beam from each prism illuminator being independently directed to said means for recombining the sub-beams.

10. The apparatus of claim 9 in which there are three display devices.

11. The apparatus of claim 10 in which;
 (a) the means for splitting the illumination beam into sub-beams comprises a first separation filter for splitting the illumination beam into a red beam and a blue-green beam, and a second separation filter for splitting the blue-green beam into a blue beam and a green beam;
 (b) the means for recombining the sub-beams comprises a first recombination filter for recombining the blue and green sub-beams into a blue-green sub-beam, and a second recombination filter for recombining the blue-green and red sub-beams.

12. The apparatus of claim 9 in which the source is a Xenon arc lamp,

13. The apparatus of claim 11 in which the separation and recombination filters are dichroic filters,

* * * * *